United States Patent [19]
Owyang

[11] Patent Number: 5,772,228
[45] Date of Patent: Jun. 30, 1998

[54] INTEGRATED REAR SUSPENSION FOR A BICYCLE FRAME

[75] Inventor: Mon Spencer Owyang, Capitola, Calif.

[73] Assignee: BeYond Beryllium Fabrications, San Jose, Calif.

[21] Appl. No.: 525,863

[22] Filed: Sep. 8, 1995

[51] Int. Cl.[6] .................................................. B62K 25/20
[52] U.S. Cl. ........................................... 280/284; 280/287
[58] Field of Search ................................ 280/281.1, 283, 280/284, 275, 287, 288

[56] References Cited

U.S. PATENT DOCUMENTS

| | | | |
|---|---|---|---|
| 644,957 | 3/1900 | Williams | 280/284 |
| 3,982,770 | 9/1976 | Satoh et al. | 280/284 |
| 4,679,811 | 7/1987 | Shuler | 280/284 |
| 5,259,637 | 11/1993 | Busby | 280/284 |
| 5,385,361 | 1/1995 | De Bei | 280/283 X |
| 5,409,248 | 4/1995 | Williams | 280/284 |
| 5,498,013 | 3/1996 | Hwang | 280/283 |

FOREIGN PATENT DOCUMENTS 559615  9/1923  France .................................... 280/284
109894  10/1917  United Kingdom ................... 280/284

*Primary Examiner*—Brian L. Johnson
*Assistant Examiner*—Avraham Lerner
*Attorney, Agent, or Firm*—Bozicevic & Reed LLP; Karl Bozicevic, Esq.

[57] ABSTRACT

A bicycle frame which includes a shock absorber assembly which is coaxial and integral with the top tube of the frame. The entire shock absorber assembly is positioned within the top tube and thus completely forward of the seat tube and rearward of the head tube. The frame typically comprises two rear wheel support tubes each of which is integral with a rear wheel dropout at their lower end and each of which is detachably connected to one of two compression struts at its upper end. Each of the compression struts is separately, detachably and pivotally connected to the shock absorber assembly. The rear wheel dropout holds the axle of a rear wheel. The frame is configured such that when the rear wheel moves upward as in traversing a bump on the road the rear wheel dropout undergoes an arcuate motion which is translated to a linear motion of a piston in the shock absorber assembly via the rear wheel support tube and compression struts.

6 Claims, 4 Drawing Sheets

INTEGRATED REAR SUSPENSION FOR A BICYCLE FRAME

FIELD OF THE INVENTION

The invention relates to bicycles and more particularly relates to bicycle frames which have an integrated rear suspension system.

BACKGROUND OF THE INVENTION

Various types of full suspension bicycles have been introduced which provide both front and rear suspension. Front suspension incorporates a shock absorbing mechanism onto or into a rigid fork. Rear suspension systems often employ the concept of incorporating a shock absorbing mechanism on or into a rigid linear member of the rear framework. Rear suspension systems can also include a system which pivots the rear wheel support framework only, separating the suspension's net influence from the bicycle's main frame (see for example U.S. Pat. No. 5,409,248, herein incorporated by reference). However, incorporation of rear suspension mechanisms into or onto the frame of a bicycle have generated bicycles of unconventional appearance in some cases and provided limited serviceability by the user; or provided single links between the rear framework and the shock absorber resulting in reduced lateral stability during use. Exteriorly mounted shock absorber assemblies can be simple to remove from the frame, repaired or replaced. However, existing integrated rear suspension systems are not removable for ease of repair and replacement of the shock absorber assembly.

There remains an unmet demand for rear suspension bicycle frames with a traditional appearance; which maintains a rigid frame; has superior handling capability for the user; and is removable by the user for ease of serviceability of the rear suspension mechanisms by the user.

SUMMARY OF THE INVENTION

A bicycle frame is disclosed which includes a shock absorber assembly which is coaxial and integral with the top tube of the frame. The entire shock absorber assembly is positioned within the top tube and thus completely forward of the seat tube and rearward of the head tube. The frame typically comprises two rear wheel support tubes each of which is integral with a rear wheel dropout at their lower end and each of which is detachably connected to one of two compression struts at its upper end. Each of the compression struts is separately, detachably and pivotally connected to the shock absorber assembly. The rear wheel dropout holds the axle of a rear wheel. The frame is configured such that when the rear wheel moves upward as in traversing a bump on the road the rear wheel dropout undergoes an arcuate motion which is translated to a linear motion of a piston in the shock absorber assembly via the rear wheel support tube and compression struts.

More particularly, this invention provides a bicycle suspension system including a shock absorber assembly integrated into the linear top tube. It is understood by one of ordinary skill in the art that substantially linear members are included in the scope of linear members as described herein. The linear top tube extends from below the seat forward of a connection with a seat tube to the head tube. The shock absorber assembly is positioned in the linear top tube between a forward tube component and a rear tube component of the linear top tube. When positioned in the top tube, the shock absorber assembly rigidly joins the forward tube component and rear tube component providing a rigid linear top tube. The main frame also includes a down tube which extends from the head tube to the foot crank opening member forming an acute angle with the top tube and an acute angle with the seat tube.

A piston assembly slidably positioned in the shock absorber assembly is pivotally connected to the rear wheel mounting framework at compression shafts which extend radially and exteriorly from the a resilient portion of the piston to the exterior of the shock absorber assembly. Linear members of the rear wheel framework pivotally contact the piston assembly compression shafts disposed on opposite sides of the piston assembly. Arcuate movement of the rear wheel framework is translated into linear movement of the shafts and piston to provide shock absorbing activity. The first linear main frame member, having the shock absorber assembly positioned between the rear tube component and the forward tube component, remains rigid as the piston assembly moves linearly within the rigid outer portion of the shock absorber assembly. A rigid pivot arm extends from a pivot member position between the down tube and the seat tube adjacent the foot crank opening member to one end of a compression strut, pivotally connecting to a compression strut adjacent the upper end of the compression strut on each side of the main frame to provide enhanced rigidity of the main frame during operation of the suspension system.

The shock absorber assembly is removable by the user from a position coaxial with the forward tube component and rear tube component of the linear top tube. Removal of the shock absorber assembly comprises removal of at least one compression strut from its contact with one of the rear wheel mounting members at one end of the strut and contact with a compression shaft at another end of the strut; and removal of a plurality of retaining means (such a screws, bolts, and the like) which maintain contact between the shock absorber assembly and the forward tube component at one end and the rear tube component of the top tube at another end. During use of the bicycle, the natural compression of the main frame exerted toward the center of the top tube along each of the rear tube component and forward tube component of the top tube contribute to maintenance of the shock absorber assembly in the top tube and limiting lateral deflection and lateral bending of the frame.

It is an advantage of the invention that the shock absorber integrated into the linear top tube between the seat tube and the head tube provides torsional rigidity due to shock absorber assembly placement; paired laterally disposed pivot locations; and at least one rigid pivot arm extending between a compression strut and the pivot member. If one pivot arm is employed, the pivot arm preferably comprises "Y" joints at two ends for contact at one end with a pair of compression struts (each compression strut operably attached at one end to a rear wheel mounting linear member and at another end contacting a compression shaft), and at another end with the pivot member on both sides of the main frame. The invention provides improved user control and bicycle performance over existing rear suspension systems by incorporating a plurality of paired, laterally positioned pivot locations to limit lateral movement of the rear wheel framework relative to the main frame.

An adjustable shock absorber load response mechanism is provided in the shock absorber assembly to limit forward movement of the piston assembly in the shock absorber assembly thereby providing a range of user selectable load responses to such ride condition variables as rider weight and road conditions. The adjustable shock absorber load response mechanism is selected according to the type of piston assembly used in the shock absorber assembly. For example, a piston assembly which compresses a gas, such as air, in the shock absorber is selectably adjustable by the addition of air to or removal of air from the sealed shock absorber assembly through a sealable access port of the shock absorber assembly. Alternatively, a shock absorber assembly which operates by compression of a spring by a piston is selectably adjustable by positioning the piston relative to one end of the shock absorber, thereby increasing or decreasing the starting compression of the spring. A shock absorber assembly will have a nominal compressibility according to the compressible materials utilized. For example, an elastomeric shock absorber can comprise one or more elastomer materials (such as a rubber material or a compressible synthetic material, for example). Materials used for a spring in a shock absorber include, but are not limited to, steel, aluminum, titanium, and beryllium. It is understood by one of ordinary skill in the art that compressibility of a spring is further varied by the diameter of the wire itself as well as the diameter of the coil.

The main frame includes a linear top tube connected to a seat tube at one end and a head tube at a second end, the seat tube having the bicycle seat at one end thereof and the foot crank opening member at the other end thereof and being connected to the top tube adjacent to the end having the bicycle seat, a down tube extending from the head tube to the foot crank assembly, and a pivot member being positioned above the foot crank opening member between the seat tube and the down tube adjacent the foot crank opening member. A plurality of pivotable connections are utilized for connecting the compression shafts, operably attached to the piston, to the rear wheel framework for translating the arcuate motion of the rear framework to linear motion of the compression shafts and piston. The rear wheel framework is pivotally connected to the main frame at the pivot member and the compression shafts.

It is a key feature of the invention that the shock absorber assembly is positioned in the top tube forward of the seat tube and rearward of the head tube.

It is another key feature of the invention that the pivotable connections between the rear framework and the main frame occur at a plurality of laterally paired pivots on the shock absorber assembly and at a pivot member that is positioned between the seat tube and the down tube of the main frame adjacent the foot crank opening member.

It is still another object of the invention to provide means for adjusting the orientation of the compression shafts about the forward/rearward axis of the shock absorber assembly by selectively and adjustably rotating the shock body. The shock absorber assembly includes a shock body, a coupler and a retaining disk operably attached to the shock body of the shock absorber assembly. The shock body encases the piston and compression chamber into which the piston moves during compression of the shock absorber. The compression shafts extend to the exterior of the shock body through elongate openings in the shock body, the openings define a path of deflection for linear reciprocal movement of the compression shafts during use. The retaining disk is operably attached to the shock body via tightening means such as screws or bolts. Between the retaining disk and the shock body is positioned a coupler. Tightening the tightening means pinches the retaining disk and coupler flange against the forward end of the shock body, thereby limiting rotation of the shock body and the compression shafts at a selected rotatable orientation. Rotation of the shock body rotates the piston and operably attached compression shafts about the forward/rearward axis of the shock absorber assembly for alignment of the shafts with the substantially forward/rearward movement of the pivotably attached compression struts. Preferably, the shafts are positioned in a line that is perpendicular to a plane defined by the main frame linear members providing movement of the shafts that is parallel to the plane of the main frame. The shock absorber assembly coupler provides refined adjustment of the rotatable position of the compression shafts for optimum movement of the shafts and pivotably contacted rear wheel mounting framework, thus providing optimized performance of the rear suspension system of the invention.

It is therefore an object of the invention to provide a bicycle and bicycle frame having rear suspension integrated into the main frame wherein an integrated shock absorber assembly is removable from the top tube and replaceable in the top tube by the user.

It is another object of the invention to provide a method for absorbing shock encountered by a bicycle moving over an uneven surface wherein the shock absorbing assembly is integrated into a top tube such that translation of arcuate motion of the rear wheel framework into linear motion of the piston occurs at a position forward of the rearmost portion of the seat tube at the connection of the seat tube and the top tube, and rearward of the head tube.

It is another object of the invention to provide a bicycle frame and bicycle having a suspension system which includes a piston assembly slidably positioned in a shock absorber assembly, and in which the shock absorber assembly is rigidly positioned in the top tube between the seat tube and the head tube of the main frame. Compression shaft members operably attached to the piston assembly and extending exteriorly and radially from the shock absorber assembly are pivotably connected to the rear wheel framework for translating arcuate motion of the rear wheel framework to linear motion of the piston.

It is another object of the invention to provide a bicycle frame and bicycle having a suspension system wherein a portion of a top tube of the bicycle's main frame includes forward and rear linear components between which the shock absorber assembly is positioned and rigidly joins the forward and rear components of the first linear main frame member.

It is yet another object of the invention to provide a bicycle and bicycle frame having a suspension system which includes a selectively adjustable shock response mechanism for providing a range of user selectable load response characteristics according to user weight and road conditions.

It is still another object of the invention to provide a bicycle frame and bicycle having a suspension system which includes a shock absorber pivotally connected with a pivotable rear wheel mounting framework by at least one pair of shafts laterally and exteriorly positioned on opposite sides of the shock absorber assembly, in which the shafts are operably connected to the piston.

It is another object of the invention to provide a bicycle frame and bicycle having a suspension system which includes a pivot member positioned between the seat tube and the down tube adjacent the foot crank opening, in which the pivotable connection is made on two sides of the bicycle with a pair of linear lower tubes.

It is still another object of the invention to provide a pivot arm extending from an end of the compression strut adjacent pivotable contact with the compression shaft to the pivot member for enhancing the rigidity of the bicycle frame and enhancing handling characteristics.

It is yet another object of the invention to provide a bicycle having main frame, a rear wheel mounting framework, a pedal assembly, a handlebar assembly, a seat and wheels, and a suspension system including a main frame having a linear top tube extending from a connection with a seat tube to a head tube, the seat tube having a seat at one end thereof and a foot crank opening member at the other end thereof, a down tube extending from the head tube to the foot crank opening member, and a pivot member being positioned adjacent the foot crank opening member and between the seat tube and the down tube, a rear wheel framework pivotably connected to the main frame at the pivot member and the compression shafts of the shock absorber assembly. The shock absorber assembly is positioned in and coaxial with the top tube between the connection with the seat tube and the head tube.

With these and other objects provided, which will be understood by one skilled in the art, the invention is embodied in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
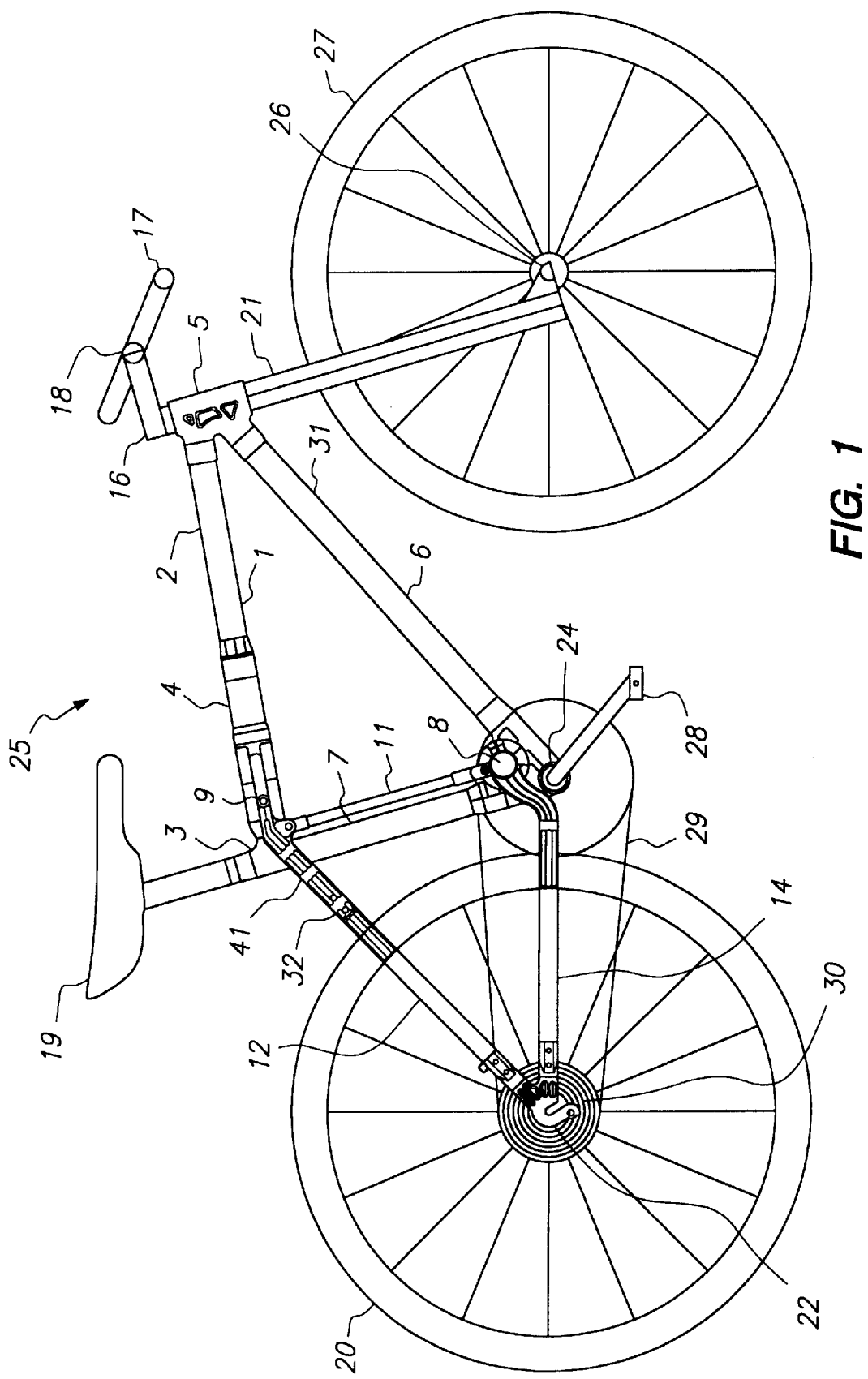
FIG. 1 is a side view of a bicycle of the invention including a main frame having a top tube, a head tube, a down tube, and a seat tube, pivot points, and shock absorber assembly positioned in the linear top tube between the seat tube and the head tube. The bicycle of the invention also includes a rear wheel mounting framework pivotably attached to the main frame, a front wheel mount, a handlebar assembly, a seat, and wheels.

FIG. 1 illustrates a side view of the suspension system of the invention in a traditional frame shape known as the double diamond shape. Bicycle 25 includes a main frame 31 and a rear wheel framework 32. The main frame includes top tube 1 having a forward tube component 2 and a rear tube component 3, a head tube 5, a seat tube 7, and a down tube 6. A shock absorber assembly 4 is positioned in top tube 1 between forward tube component 2 and rear tube component 3 and is coaxial with them. The rear wheel framework includes a linear low tube 14, a rear wheel dropout 22, and a rear wheel support tube 12. The bicycle also includes a seat assembly 19, handle bar assembly 18 including handlebars 17 and handlebar mounting stem 16, foot crank opening member 24, and front fork 21, front wheel mount 26, and front wheel 27 mounted thereon. As described herein, the terms top, bottom, upper, lower refer to the bicycle or bicycle frame as it is oriented during normal operation. The side or sides of the bicycle or bicycle frame refer to left and/or right side as seen by a rider during use of the bicycle.

Foot crank opening member 24 includes pedal assembly 28 normally connected to a bearing and drive gear assembly 30 in a conventional manner. Chain 29 is mounted between foot crank opening member 24 and drive gear assembly 30 for driving rear wheel 20.

The suspension system of the invention includes main frame 31, rear wheel mounting framework 32 and shock absorber assembly 4. The linear members of main frame 31 and rear wheel frame work 32 form the front and rear triangular components respectively, of the traditional double diamond shape of a bicycle frame. Under normal operation, the rear framework comprises laterally paired members. As would be understood by one of ordinary skill in the art, a description of the rear wheel mounting framework 32 as seen from one side of the bicycle frame of the invention provides a description of the rear wheel mounting framework from the opposite side of the bicycle frame. Thus, one side of rear wheel mounting framework 32 comprises a linear lower tube 14 attached at one end to a pivot member 8 and at another end to a rear wheel dropout 22, a rear wheel support tube 12 attached at one end to rear wheel dropout 22 and at another end a compression strut 41. Compression strut 41 pivotably contacts a compression shaft 9 on a side of shock absorber assembly 4. At least one pivot arm 11 is provided, one end of which pivotably contacts a pivot member 8 and at another end is pivotably in contact with a compression strut 41 adjacent a pivotable contact of compression strut 41 with compression shaft 9. Compression strut 41 is bent substantially parallel to the forward/rearward axis of movement during normal operation at an angle 35 which is sufficient to provide a convenient distance of linear top tube 1 above a surface which a bicycle of the invention contacts during normal operation.

Figure 2A:
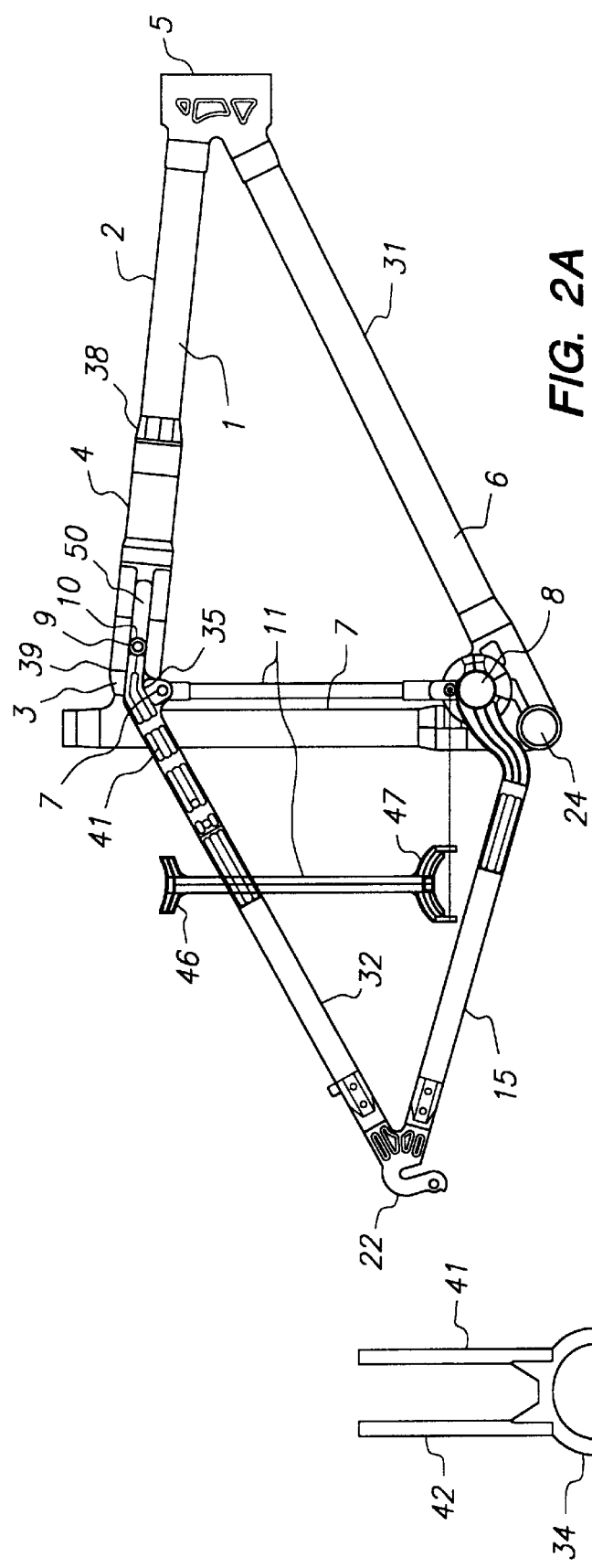
FIG. 2A is a side view of a bicycle frame as in FIG. 1 showing the suspension system in more detail.
Figure 2C:
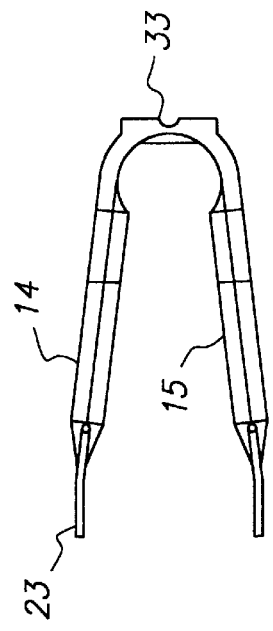
FIG. 2C is an overhead detail view of a portion of FIG. 2A.
Figure 2B:
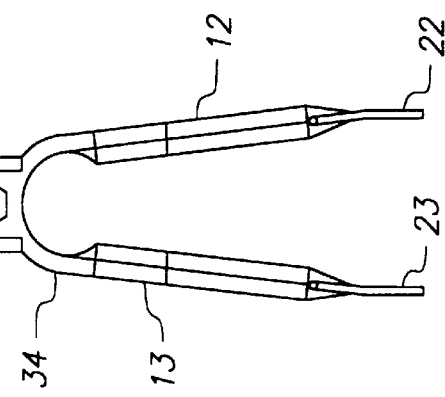
FIG. 2B is a frontal detail view of FIG. 2A.

FIGS. 2A through 2C illustrate the bicycle frame of the invention in further detail. Shock absorber 4 can be any type of shock absorber including, but not limited to, air/oil dampened type shock absorbers, spring type shock absorbers, elastomeric shock absorbers, and the like. Preferred is an air/oil type shock absorber. As shown in FIG. 2 for one side of a bicycle frame of the invention, rear wheel mounting framework 32 is comprised of linear lower tube 14 extending from pivot member 8 to rear wheel dropout 22 which support the rear axle and on which rear wheel 18 is mounted. The paired nature of rear wheel framework 32 is considered in FIG. 2 which illustrates that a stabilizing bar 33 extends between linear lower tubes 14 and 15. A rear wheel support tube 12 is operably attached to compression strut 41 and pivotably connected with the main frame at compression shaft 9. FIG. 2B illustrates that a stabilizing bar 34 extends between rear wheel mounting linear members 12 and 13 at ends adjacent attachment to compression struts 41 and 42. In a preferred embodiment of the invention pivot arm 11 comprises a lower "Y" junction 47 at one end for pivotable contact with opposite sides of pivot member 8 and an upper "Y" junction 46 at another end for pivotable contact with compression struts 41 and 42. It is readily understood that a bicycle frame comprising a plurality of pivot arms extending between pivot member 8 and compression struts 41 an 42 are within the scope of the present invention. The various members which are not pivotably in contact are connected in a conventional fashion, for example by bolting, welding or the like.

Main frame 31 includes substantially linear framework members 1, 6, and 7. Linear top tube 1 extends from a forward point of contact with seat tube 7 to head tube 5, seat tube 7 extends from the seat assembly 19 to foot crank opening member 24, down tube 6 extends from head tube 5 to foot crank opening member 24 forming an acute angle with seat tube 7 as well as forming an acute angle with linear top tube 1. Linear top tube 1 comprises a forward tube component 2 and a rear tube component 3, a portion of top tube 1 being removed between forward component 2 and rear component 3. Shock absorber assembly 4 rigidly joins forward tube component 2 and rear tube component 3, shock absorber assembly 4 being positioned between and coaxial with components 2 and 3.

Rear wheel mounting framework 32 is pivotably connected to main frame 31 at pivot member 8 on opposite sides of main frame 31, and at compression shafts 9 and 10 on shock absorber assembly 4. Compression shaft 10 is positioned in the same manner as compression shaft 9 but on the opposite side of shock absorber assembly 4. Pivot member 8 is positioned between seat tube 7 and down tube 6 adjacent foot crank opening member 24. Preferably, pivot member 8 is not more than 6 inches from foot crank opening member 24. Pivot member 8 comprises pivotable connections on each side of the bicycle frame of the invention. Compression shafts 9 and 10 are disposed on opposite sides of shock absorber assembly 4 and are operably attached to piston 43. Arcuate motion of rear wheel mounting framework 31, more particularly, rear wheel support tubes 12 and 13 attached to compression struts 41 and 42, is translated into linear motion of compression shafts 9 and 10, respectively, resulting in linear deflection of piston 43 within the shock absorber assembly 4. Compression struts 41 and 42 form angle 35 which is between 10 and 60 degrees, preferably approximately 45 degrees, at the end adjacent the pivotable connection with compression shafts 9 and 10, respectively. Preferably, angle 35 is positioned at a distance from the pivotable connection with compression shaft 9 or 10 sufficient to provide for a first linear main frame member which is at a desirable distance above a surface (for example, the ground) which a bicycle of the invention contacts during normal use. A desirable distance is one which maintains a traditional appearance of the bicycle frame of the invention and further, provides for a convenient height over which a user can stand when straddling a bicycle of the invention. Pivot arm 11 is operably attached at one end to "Y" junction 46 which is pivotably connected to the rear wheel mounting framework 32 from compression strut 41 on one side of main frame 31, preferably at angle 35 of compression strut 41. Pivot arm 11 is operably attached at another end to "Y" junction 47 which pivotably connects with each side of pivot member 8. The centers of pivotable connection between pivot member 8 and foot crank opening member 24 is preferably no more than approximately 6 inches, more preferably no more than approximately 3 inches. In this manner, a more active suspension is provided, thereby improving the ride for the user. Superior stability and rigidity of the bicycle frame and bicycle of the invention is accomplished by the paired lateral pivot connections between rear wheel mounting framework 32 and main frame 31.

Figure 3:
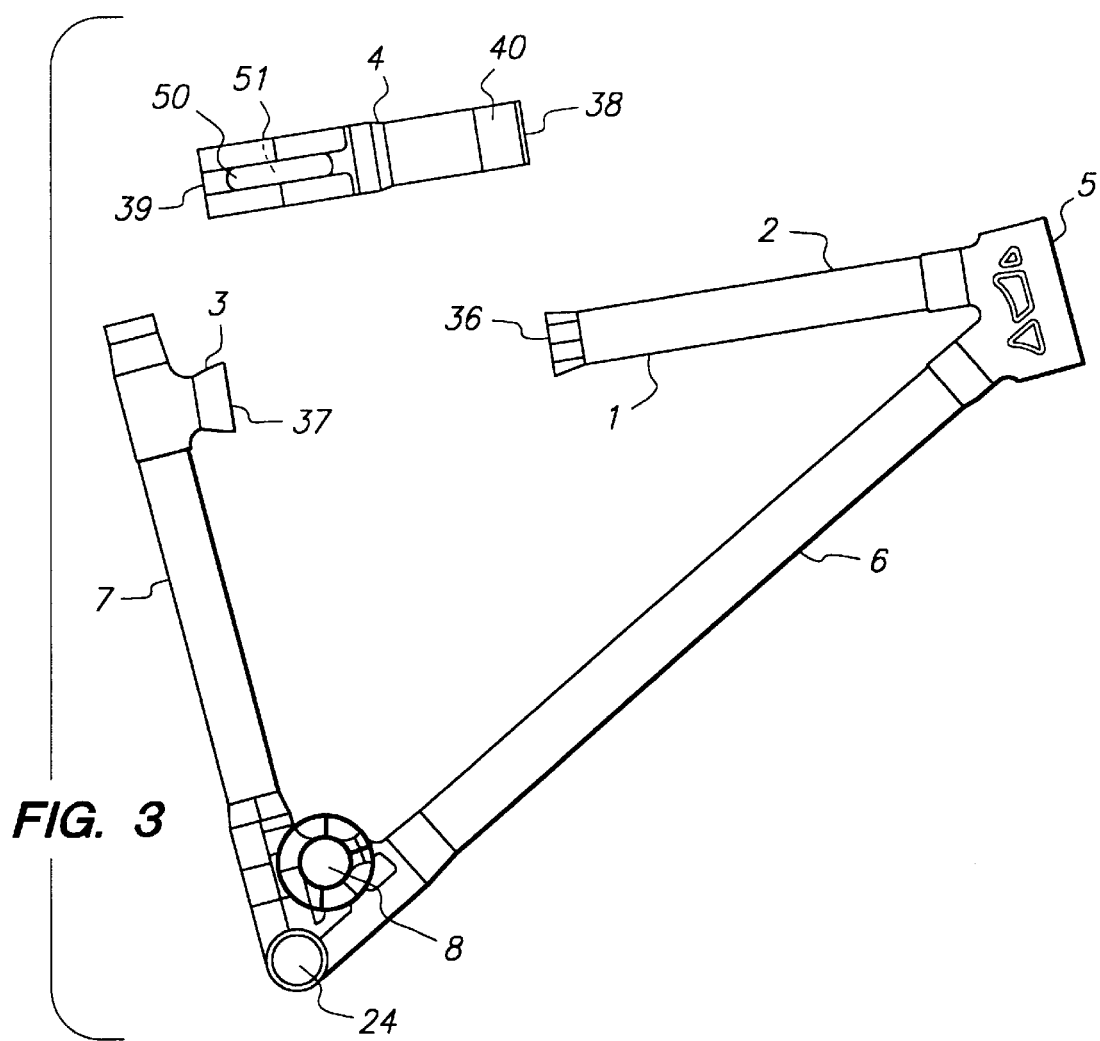
FIG. 3 is a side view of the main frame comprising the linear top tube, the seat tube, and the down tube, showing removal of the shock absorber assembly from the top tube.

FIG. 3 illustrates main frame 31 in detail, particularly illustrating removal of shock absorber assembly 4 from between forward tube component 2 and rear tube component 3 of first linear top tube 1. Forward tube component 2 has at an end adjacent to shock absorber assembly 4 a forward tube component connection member 36 comprising members which are complementary in shape and position to members on forward shock end connection member 38. Rear tube component 3 has at an end adjacent to shock absorber assembly 4 a rear tube component connection member 37 which comprises members which are complementary in shape and position to members on rear shock end connection members 39. Such complementary members include, but are not limited to, ridges and complementary depressions, an extension of shock absorber assembly 4 which inserts a finite distance into forward tube component 2 and rear tube component 3, and the like.

Figure 4A:
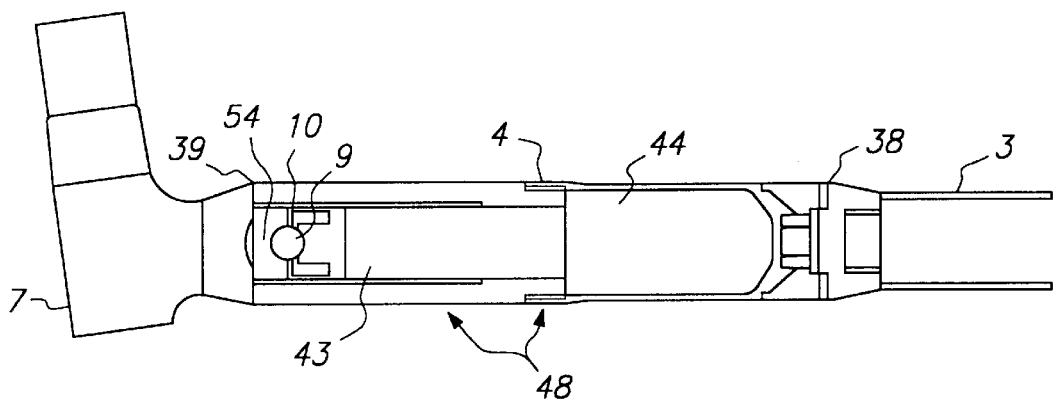
FIG. 4A is a more detailed view of the shock absorber assembly showing the piston, the piston locking member, the coupler and coupler retaining disk for rotation of the piston in the shock absorber assembly.
Figure 4B:
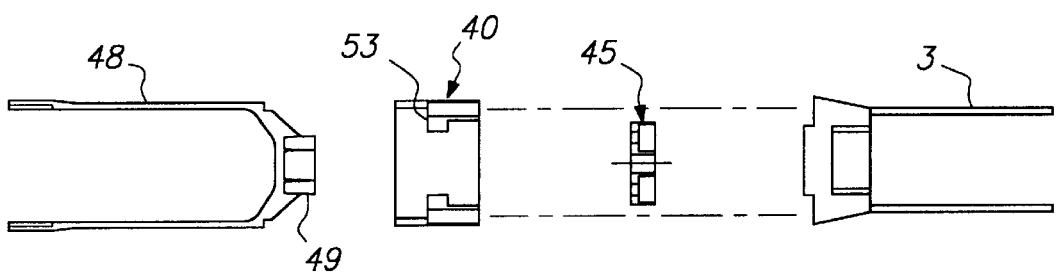
FIG. 4B is a cross sectional view of a portion of the assembly.
Figure 4C:
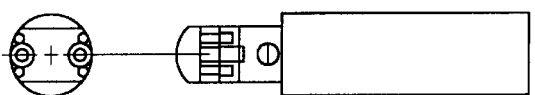
FIG. 4C is a detailed view of the piston of FIG. 4A.

FIGS. 4A through 4C illustrate a cross sectional view of shock absorber assembly 4 in more detail. Shock absorber assembly 4 comprises a shock body 48 which encases a piston 43 (operably attached to compression shafts 9 and 10) and defines a compression chamber 44. Shock absorber assembly 4 further comprises a coupler 40 and retaining disk 45 which provides means for adjusting orientation of compression shafts 9 and 10 rotatably about the forward/rearward axis of shock absorber assembly 4. Such rotatable adjustment is performed when shock absorber assembly 4 is removed from linear top tube 1. Forward shock body coupling end 49 contacts coupler 40 adjacent a rearward-facing side of inwardly projecting coupler flange 53. Retaining disk 45 is positioned within coupler 40 adjacent a forward-facing side coupler flange 53 as illustrated in FIG. 4. Retaining disk 45 is operably attached to shock body 48 at forward shock body coupling end 49 by one or more attachment means (preferably a bolt) such that shock body 48 and retaining disk 45 are rotatable together. At selected compression shaft orientation, rotation of shock body 48 is prevented by tightening the attachment means (such as bolts) thereby pressing retaining disk 45 against coupler flange 53 and shock body coupling end 49 with sufficient force to prevent rotation of shock body 48 and thereby prevent rotation of piston 43 and compression shafts 9 and 10. Releasing retaining disk 45 within coupler 40 provides unrestricted rotation of retaining disk 45 and thereby provides for unrestricted rotation of rigid shock body 48, piston 43, and compression shafts 9 and 10. Rotation of rigid shock body 48 provides for rotational positioning of compression shafts 9 and 10 in a selected position for optimum reciprocating linear movement of compression shafts 9 and 10 in an opening in shock absorber body defining compression shaft linear deflection paths 50 and 51 (where 51 is indicated as being positioned in the same manner as 50 on the opposite side of shock absorber assembly 4.

Shock absorber assembly 4 also comprises a shock load adjustment means 52 which provides for adjustment of compressibility of the compressible materials of the shock absorber mechanism, such as compression of a spring or compression of a gas (as appropriate for the selected shock absorbing assembly), thus allowing the user to adjust shock compression to accommodate user weight or road conditions. Preferably shock absorber assembly 4 allows up to approximately 4 inches of rear wheel arcuate motion which translates to approximately 2 inches of substantially linear motion of the piston. Selective limitation of piston movement is further provided by piston locking member 54 which prevents movement of compression shafts 9 and 10, thereby preventing movement of piston 43. A piston locking member can be a means of mechanical limitation of reciprocal compression shaft movement such as locking pins and the like. Alternatively limitation of piston movement is provided by limiting the compressibility of the compressible material in shock absorber assembly 4, such as by increasing the air pressure in an air/oil type shock absorber, and the like.

Shock absorber assembly 4 further comprises a rigid outer shell encasing linearly reciprocatable piston 43. The rigid outer shell of shock absorber assembly 4 maintains the rigidity of first linear main frame member when positioned between forward tube component 2 and rear tube component 3. According to the invention, shock absorption occurs as translation of arcuate motion of the rear wheel support tube 12 into linear deflection of compression shaft 9. Piston deflection occurs forward of the point at which seat tube 7 and top tube 1 contact below the seat assembly. Preferably, shock absorber assembly 4 is sealed as a self-contained unit and said sealing is independent of connections with forward tube component 2 and rear tube component 3 of linear top tube 1.

Removal and replacement of shock absorber assembly 4 in linear top tube 1 is accomplished, for example, by manually deflecting forward tube component 2 and rear tube component 3 away from the center of first linear top tube 1 to provide a space slightly larger than shock absorber assembly 4, followed by removal or placement of shock absorber assembly 4 into first linear top tube 1 as illustrated in FIGS. 2 and 3. The natural compression of the main frame toward the center of first linear top tube 1 which exists when the bicycle of the invention is in use assists in maintaining shock absorber assembly 4 in position between forward tube component 2 and rear tube component 3. Additional retention means such as a plurality of bolts are used to further assure maintenance of shock absorber assembly 4 integrated into first linear top tube 1 during normal operation of a bicycle or bicycle frame of the invention. Such additional retention means operably attach forward shock end connection member 38 of shock absorber assembly 4 to forward tube component 2 at forward tube component connection member 36. Such additional retention means further operably attach rear shock end connection member 39 of shock absorber assembly 4 to rear tube component 3 at rear tube component connection member 37 of first linear top tube 1.

It is readily appreciated that additional shock absorbing mechanisms may be included in the rear suspension bicycle of the invention to provide further shock absorption capability such as in the front forks or handle bar assembly. Such additions are within the scope of the present invention.

As may be understood by one of ordinary skill in the art, a superior rear suspension system for a bicycle is provided which allows removal of the shock absorber assembly from the main frame by the user for ease of repair or replacement. The shock absorber, integrated into first linear top tube, is positioned forward of the connection between first linear top tube and second linear seat tube below the seat assembly. The rear suspension system of the invention provides superior suspension characteristics as well as superior torsional and lateral rigidity of the bicycle frame for improved handling and ride characteristics.

What is claimed is:

1. A bicycle frame, comprising:

a linear top tube having a forward tube component and a rear tube component, each tube component having a first and a second end;

a head tube connected at a substantially perpendicular angle to said first end of said forward tube component;

a down tube having a first and second end, said first end attached to said head tube at an acute angle relative to said top tube;

a seat tube having a top end comprising a seat post opening and a bottom end comprising a foot crank opening member, said seat tube attached to said rear tube component at a point adjacent to said top end of said seat tube and attached to said down tube at said foot crank opening member of said bottom end such that said seat tube is positioned at an acute angle relative to said down tube;

a pivot member positioned between said down tube and said seat tube adjacent to said seat tube opening;

a linear lower tube having a first and second end, said first end pivotably connected to said pivot member and said second end integral with a rear wheel drop out;

a rear wheel support tube having a first and second end, said first end integral with said rear wheel drop out; and a shock absorber assembly comprising:
   a rigid shock body, a forward shock end connection member, and a rear shock end connection member;
   a releasable connection to the forward tube component at said forward shock end connection member; and
   a releasable connection to said rear tube component at said forward shock end connection;

wherein said shock absorber assembly is removable from said linear top tube and replaceable in said linear tube, and wherein replacement of said shock absorber assembly rigidly joins said rear tube component and said forward tube component of said linear top tube.

2. The bicycle frame of claim 1, the shock absorber assembly further comprising:

a piston having at least two compression shafts extending radially relative to said top tube;

a compression strut having a forward and rear end, said forward end pivotably connected to said compression shafts such that arcuate motion of the rear wheel drop out translates to linear motion of the piston via said compression strut;

a rigid shock body encasing said piston in a compression chamber wherein said compression shafts extend radially from said piston to the exterior of said shock body in a deflection path opening of said shock body; and an adjustment means comprising a retaining disk and a coupler;

wherein said shock body and said retaining disk are rigidly connected by attachment means with a portion of said coupler positioned between said shock body and said retaining disk, wherein adjustment of said attachment means limits the rotation of said shock body, allowing for selective adjustment of the orientation of said compression shafts and said piston.

3. The bicycle frame of claim 1, further comprising:

a pivot arm having an upper and lower end, said lower end pivotably connected to said pivot member and said upper end pivotably connected at the forward end of said compression strut.

4. The bicycle frame of claim 3, wherein said pivot arm is detachable from said frame.

5. The bicycle frame of claim 3 wherein the lower end of the pivot arm forms a Y junction and is connected to the pivot member at two points.

6. The bicycle frame of claim 3 wherein the upper end of the pivot arm forms a Y junction and is connected to the compression strut at two points.

* * * * *

UNITED STATES PATENT AND TRADEMARK OFFICE
CERTIFICATE OF CORRECTION

PATENT NO. : 5,772,228
DATED : June 30, 1998
INVENTOR(S) : Ratko Cvijanovic

It is certified that error appears in the above-indentified patent and that said Letters Patent is hereby corrected as shown below:

Claim 10, line 54, change the word "radically" to
--radially--.

Signed and Sealed this

Twenty-second Day of June, 1999

Attest:

Q. TODD DICKINSON

*Attesting Officer*   *Acting Commissioner of Patents and Trademarks*